United States Patent [19]

Keeley

[11] Patent Number: 6,138,271
[45] Date of Patent: *Oct. 24, 2000

[54] OPERATING SYSTEM FOR EMBEDDED COMPUTERS

[75] Inventor: Thomas Keeley, Brookfield, Wis.

[73] Assignee: Rockwell Technologies, LLC, Thousand Oaks, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/669,739

[22] Filed: Jun. 26, 1996

[51] Int. Cl.[7] .................................................. G06F 9/45
[52] U.S. Cl. ................................................. 717/5; 717/10
[58] Field of Search .................................. 395/710, 705, 395/701, 712, 702, 703; 707/10; 717/5, 3, 2, 10, 1

[56] References Cited

U.S. PATENT DOCUMENTS

| | | | |
|---|---|---|---|
| 4,868,376 | 9/1989 | Lessin et al. ............................ | 235/492 |
| 5,325,533 | 6/1994 | McInerney et al. ..................... | 395/700 |
| 5,524,244 | 6/1996 | Robinson et al. ....................... | 395/700 |
| 5,619,250 | 4/1997 | McClellan et al. ....................... | 348/10 |
| 5,649,204 | 7/1997 | Pickett ..................................... | 395/710 |
| 5,699,542 | 12/1997 | Mehtra et al. ........................... | 395/412 |
| 5,778,368 | 7/1998 | Hogan et al. ............................ | 707/10 |
| 5,854,936 | 12/1998 | Pickett .................................... | 395/710 |
| 6,029,000 | 2/2000 | Woolsey et al. ......................... | 395/705 |

OTHER PUBLICATIONS

Neumann et al, "Open Systems and Interfaces for Distributed Electronics in Cars (OSEK)", Automotive Multiplexing Technology, SP1070, No. 95021, 1995.
Tartan, Tartan Introduces . . . C/C++ 2.0, C/C++ Users Journal,v13,n1,p. 102(1), Jan. 1995.
Wilson (Andrew), Fast Chips find Imaging Boards . . . , Electronic System design Mag.,v19,n12,p. 20(1), Dec. 1989.
Frankel (Bob), DSP's Find Real Time Embedded Use, Electronic Engineering Times,n844,p. 68, Apr. 17, 1995.
Oram et al, Managing Projects with Make, O'Reilly and Assoc.,p. 1–3,31,72,84–85, Dec. 1991.

Primary Examiner—Majid A. Banankhah
Assistant Examiner—Sue Lao
Attorney, Agent, or Firm—Keith M. Baxter; John J. Horn; William R. Walbrun

[57] ABSTRACT

An operating system particularly designed for application programs to be used on embedded computers in appliances and the like is constructed in a modular basis. The application program is scanned for calls to the operating system and the particular modules of the operating system required for the application program are collected into an operating system kernel which may be linked and loaded with the application system into the embedded application.

4 Claims, 2 Drawing Sheets

OPERATING SYSTEM FOR EMBEDDED COMPUTERS

FIELD OF THE INVENTION

The invention relates generally to computer operating systems and in particular to a computer operating system adapted for use in a limited memory computer that may be embedded in other products.

BACKGROUND OF THE INVENTION

Operating systems are programs that run on a computer to provide a standard interface between the computer hardware and application programs that must run on that computer.

For example, the "DOS" operating system ("Disk Operating System") and its successor "Windows" operating systems which are both commonly used on desk-top, PC-style computers, provide a set of standard operations that may be invoked by an application program to perform routine tasks associated with controlling the computer hardware. These popular operating systems, for example, both provide one or more operations to read information from a disk drive. The operating system operations require relatively few arguments, for example, a name of a logical disk drive, a name of the file to be read, and a name of a variable to which the file is to be returned. The operating system reads the file then returns its values to the predesignated variable. In this way, a programmer, who is writing an application program that requires information off a disk drive, can avoid the laborious and varying mechanics of reading a disk drive which may require many additional steps including interpreting the disk directory to find out which disk sectors hold the information desired, connecting the information in disjoint sectors into a file, and observing the complex steps of activating the disk drive motors and read heads to read the desired sectors in order.

The operating system operations are accessed through an API ("application programmer's interface"). The API may expose one or more function calls (like those used to access a hard disk). The application programmer can access those API-exposed operations with programming languages like C or Pascal. On a machine level, the operating system operations are invoked by branching to a particular location of the operating system, either directly or via an interrupt vector, after the necessary arguments are placed in a known location in memory, such as particular registers or the stack. When the operation is complete, the operating system returns the desired values to the predetermined memory locations and branches back to the point in the application program where the operating system operation was invoked.

Complex operating systems may have over 5,000 operating system operations providing for not only the reading and writing to disk drives, described above, but the printing of data to printers, the controlling of modems, the opening and closing of windows displayed on the computer monitors, and the managing of the execution of multiple application programs in a multi-tasking environment.

The use of an operating system not only simplifies the application programmer's tasks, but importantly creates a uniform software environment for developing application programs that are independent of the particular hardware on which the application is to be run. This increases the "portability" of application programs between computers with different configurations of hardware, different generations of a particular computer family, and in some cases different computer families. Care is taken that a program written for an earlier version of an operating system will run on later versions of the operating system, so that obsolescence of the application programs may be reduced.

In part by shielding the application developer from changes in computer hardware, operating systems have encouraged the creation of powerful and flexible software development tools. For example, a number of major software suppliers provide compilers for the Windows operating system. These compilers allow application developers to write applications in the latest high level computer languages, compile them for the Windows operating system, and to be ensured that the application program can then run on any of a large number of computers using the Windows operating system. In addition to compilers, a host of other development tools are available for the popular operating systems including those that assist a programmer in editing and troubleshooting compiled programs.

Conversely, it is true that many development systems using higher level languages, which can significantly reduce application development time, are available only for the latest generation of complex operating systems. This presents a problem for the development of application programs intended for computers embedded in products, for example, video equipment or home appliances. Typically, these embedded computers do not have a full complement of peripherals associated with them. For example, an embedded computer normally will not have disk drives but may rely entirely on programs and data contained in read-only memory, and may not support a standard computer keyboard or display, but may use a limited display and a small number of buttons for inputting. Most importantly, such embedded computers have limited memory.

As the complexity of programming embedded computers increases, it would be desirable to use high level programming languages and tools developed for general purpose desk-top computers running complex operating systems. Unfortunately, for application programs developed by these tools to run, it is necessary that the complex operating system be loaded into the memory of the embedded computer along with the application program. Such operating systems require many megabytes of memory for storage and are therefore impractical for most embedded computer applications.

SUMMARY OF THE INVENTION

The present invention provides a development system that allows application programs to be developed in the environment of a complex operating system and then to be loaded into embedded computers having limited memory. To accomplish this, the operating system is partitioned into modules each associated with one or a limited number operating system operations. The application program is then developed using the tools for the modular operating system. Prior to being loaded into the embedded computer, the application program is scanned for operating system operations, which are identified to particular modules of the operating system. These modules only are collected to form a smaller operating system kernel that may be readily loaded into an embedded computer. Thus, the application program may be freely developed on a larger operating system model using readily available tools.

More specifically, the invention provides a software development system including a modular operating system program having a plurality of modules each providing an operating system operation that may be called by an application program. The operating system operations permit application programs to communicate with particular computer hardware or other executing programs. A scanner program reviews the application program for calls to operating system operations to produce an OS module list of such application calls; and a selective compiler program receiving the OS module list prepares an operating system comprised of only those modules of the modular operating system necessary to perform the application calls of the OS module list that may be loaded into the embedded computer.

Thus, it is one object of the invention to provide an operating system that is modular so that selected modules may be collected and reformed into a smaller operating system necessary for a particular application program in an embedded environment.

It is another object of the invention to permit programmers developing applications for embedded computers to develop their application programs using a full-featured operating system that supports high level languages and development tools.

The scanner program may include in the OS module list subsequent calls from an operating system module (referenced in the OS module list) to other operating system operations.

Thus, it is another object of the invention to permit the operating system to make calls to itself thereby reducing the total memory required to store the operating system needed for the application program.

The OS module list produced by the scanner may identify both operating system modules and portions of those modules needed for the application program, the portions identified by conditional compiler directives instructing the selective compiler to compile only the portions of the modules which it receives. The development system may further include a builder receiving the modular operating system and providing to the compiler only the modules identified by the OS module list.

Thus, it is another object of the invention to provide the ability to reduce the size of the operating system for use with an embedded computer, beyond the reduction in size which could be obtained simply by accepting the division of the operating system into modules according to predefined operating system operation calls.

The development system may also include a non-modular version of the operating system providing the same operating system operations as the modular operating system and a compiler for compiling the application program for execution on a computer having the non-modular operating system in memory.

Thus, it is another object of the invention to permit application development on a non-modular operating system having similar operations.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
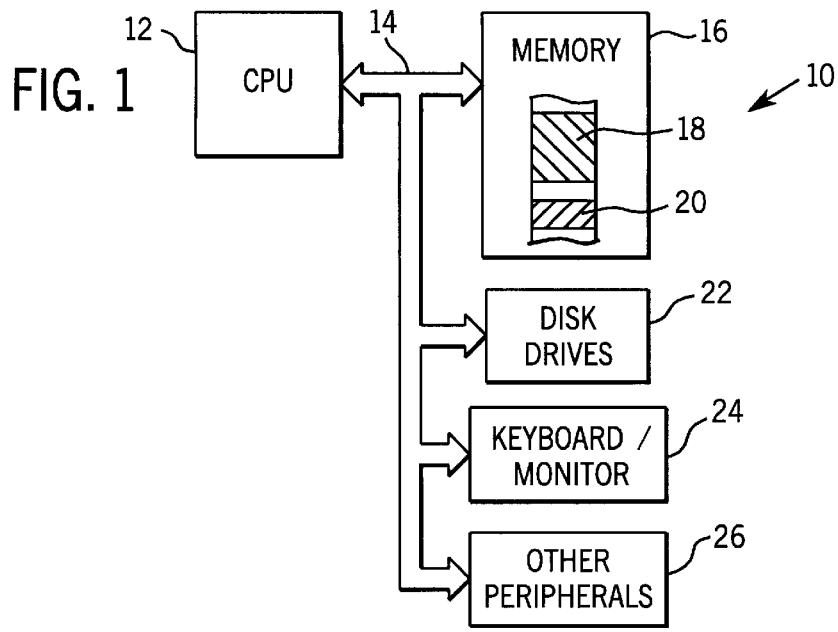
FIG. 1 is a block diagram of a general purpose computer suitable for use in developing application programs such as may be run on an embedded computer comprising a subset of the computer shown and, in particular, less computer memory.

Referring now to FIG. 1, a computer system 10 such as might be used for the development of an application program 20, includes a central processing unit ("CPU") 12 which may be a microprocessor based single board computer or the like. The CPU 12 communicates via a bus 14 to computer memory 16 having memory locations addressable by the CPU 12 for storing data at and receiving data from addresses in the memory 16. During an application program development, the memory 16 will normally hold both an operating system 18 and an editable version of the application program 20 (termed "source code") as well as other programs, for example, an editor program or compiler program (not shown) as are well known in the art.

The bus 14 may also communicate with one or more disk drives 22 providing lower cost data storage than the memory 16. Some of the operating system 18, may be stored on the disk drives 22 and swapped into and out of memory 16 for reasons of economy.

The CPU 12 also communicates with a keyboard/monitor 24 well known in the art, the monitor portion of which provides for outputting of information as text or graphics, and the keyboard portion of which allows the inputting information. The keyboard may be supplemented with a cursor control device such as a mouse or trackball as is well understood in the art.

Also shown attached to the bus 14 are other peripheral devices 26 which may generally include modems, optical text scanners, printers or the like which may be useful for the development of programs.

As described, the computer system 10 represents a common platform for the development of application programs for embedded systems or otherwise. A large amount of memory 16 and the various peripherals 22–26 allow the computer system 10 to run a full function operating system supporting state of the art compilers and development tools. Because the architecture of computer system 10 is similar to a large number of other computer systems that together provide a large and uniform market, high level applications development tools are available for the computer system 10.

Referring still to FIG. 1, the application program 20 is intended to be run on an embedded system, for example, a consumer product. In this environment, the application program 20 may not make use of all the hardware associated with the computer system 10. For example, the embedded environment will typically not include disk drives 22 or keyboard/monitor 24. On the other hand, the embedded environment will normally include other specialized circuits controlling the particular product and will receive data from special buttons on that product and will output data to indicator lamps and displays on the product.

Figure 2:
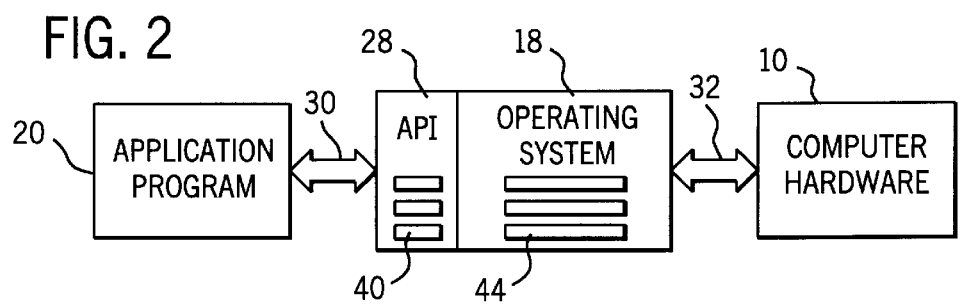
FIG. 2 is a general blocked diagram of communications between an application program and the computer hardware of FIG. 1, via an operating system and its application program interface.

Referring now to FIG. 2, during execution of the application program 20, the application program 20 makes calls to operations provided by the operating system 18. These operating system operations perform particular tasks associated with communicating with the particular hardware of the embedded computer system 10. The application program calls the operating system operations via an application programmer's interface ("API") 28 which provides a standard set of operation names 40 that are linked to particular modules 44 of the operating system holding corresponding operations, each operation being a routine for performing the desired operation (e.g., a disk read, etc.). The API 28 provides an upwardly compatible interface to the application program regardless of changes and upgrades in the operating system 18.

The application program 20, when it is written, includes these operation names 40 from the API 28, of desired operations together with the appropriate arguments for the operation dispersed throughout the body of the application program 20 as needed. At the time of compiling or linking, the operation names 40 are replaced with calls to the particular modules 44 with which they are associated and the arguments of the operation are stored in registers or memory locations according to predefined conventions associated with the API.

The operation of calling the modules 44, on a machine level, may occur by means of direct jumps from the application program to the operating system 18 guided by an API file (not shown) that links memory locations of the modules 44 to the particular operation names 40 associated with those modules 44, or through software interrupts to vectors in memory locations loaded from the API file which redirect the program to the particular operating system modules 44. Such calls to operating systems are well known in the art.

When an operation of a module 44 of the operating system is thus called, the instructions of the operation associated with that module 44 are executed to control various aspects of the computer system 10, typically by bus commands 32 according to data stored in predefined memory locations or registers. The operating system then takes any data that is to be returned as an operation value and stores that data in predefined memory locations or registers. Upon conclusion of this operation, the operating system 18 returns control to the application program 20. Thus, the developer of the application 20 need not be concerned about the low level programming unique to each computer system 10 necessary to perform basic hardware related tasks.

Figure 3:
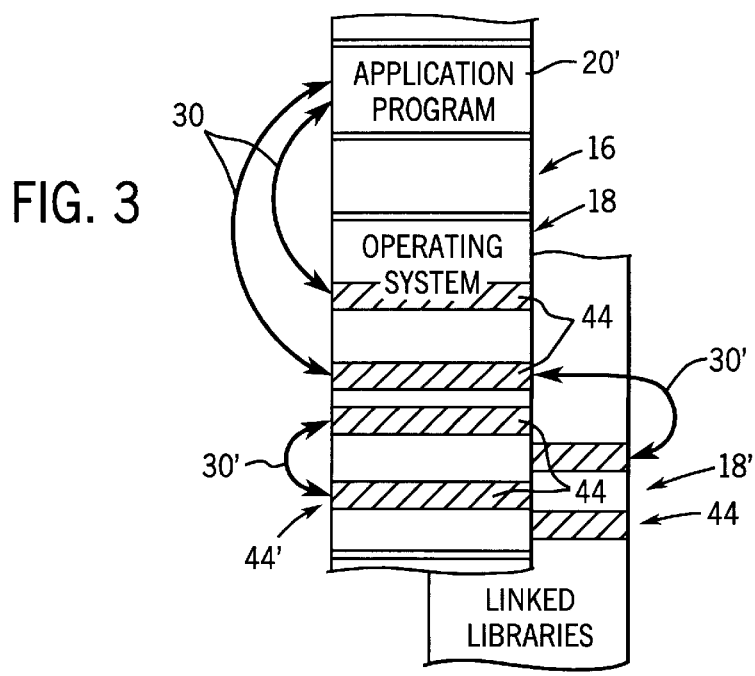
FIG. 3 is a schematic representation of computer memory of FIG. 1 showing an interlinking of an application program and an operating system through a series of calls to operating system operations.

Referring now to FIG. 3, a typical application program 20' for an embedded application will make a number of calls 30 to modules 44 of the operating system 18 stored in memory 16 along with the application program 20'. Those calls 30 may invoke the execution of modules 44 within the operating system 18 that in turn make calls 30' to other modules 44 in the operating system 18. Thus, some of these modules 44 will be executed in direct response to the calls 30 from the application program whereas other modules 44 will be executed in response to calls from other modules 44. This nesting of calls allows for a more compact operating system 18.

Note that generally portions of the operating system 18' may be stored, for example, as linked libraries to the operating system 18 on disk drive 22 or the like if the application is run on the computer system 10 used for the development of the application program.

Normally an application program 20 for an embedded system will use only a small fraction of the total number of modules 44 of the operating system 18. This follows from the purpose of the operating system in providing an interface to the hardware of the computer system 10 and the reduced hardware in an embedded computer system. For this reason, the present inventor has recognized that it is possible to use a full featured operating system for the development of application programs and also for the embedded application if the modules 44 or portions of the modules 44 used by the application program 20' could be removed from the operating system 18 and collected in a subset or kernel. This kernel could be attached to the application program (without the remaining operations of the operating system 18) and wholly stored in the limited memory of the embedded application. This approach would eliminate the need to preselect a subset of a full featured operating system 18 for use in embedded applications that might be appropriate for some application programs (for example those requiring no disk drives) but inappropriate for others (for example those providing disk drives).

Figure 4:
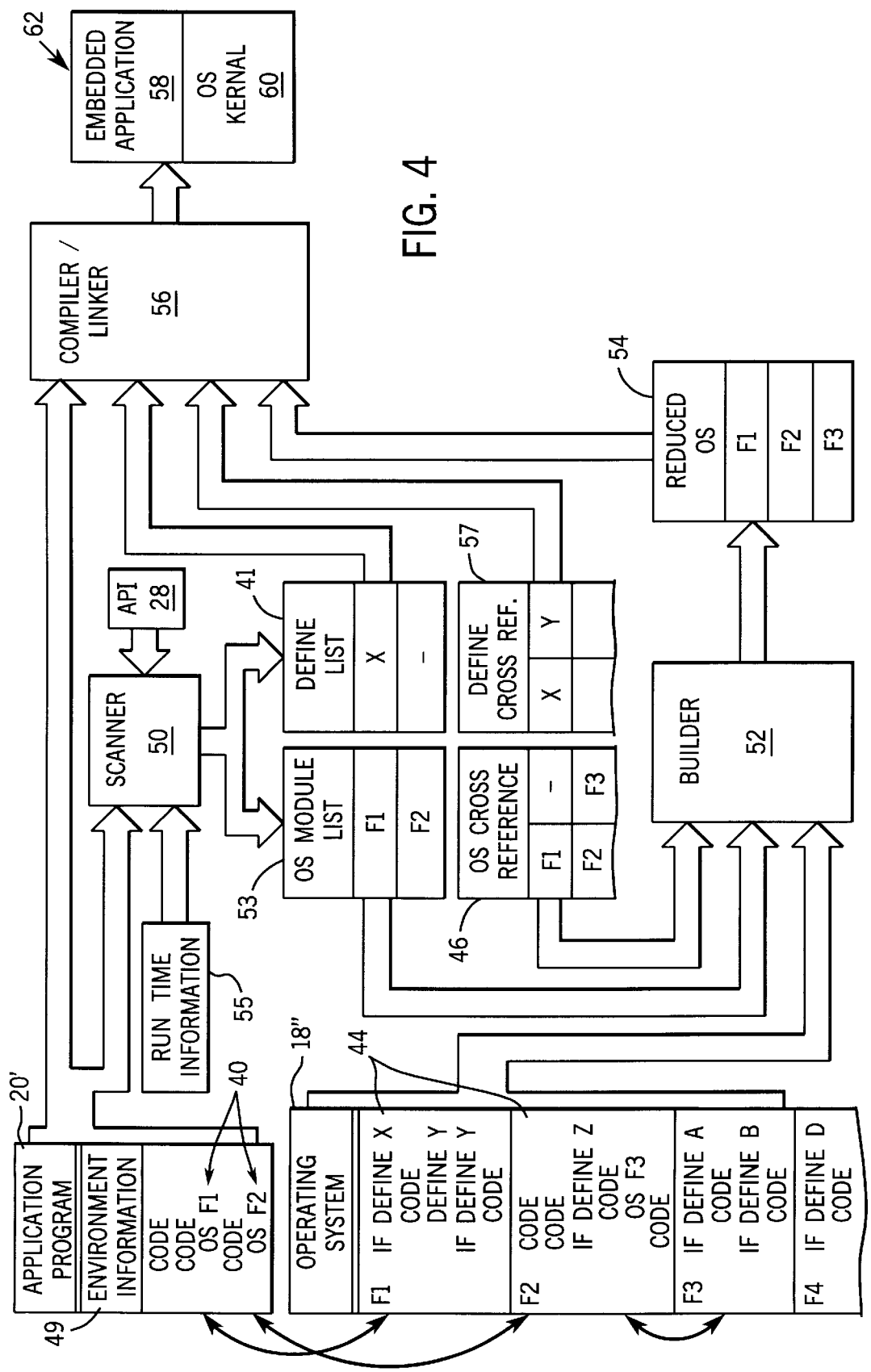
FIG. 4 is a schematic representation of the development system of the present invention in producing a reduced size operating system that may be embedded with a particular application program into a computer.

Referring now to FIG. 4, in the present invention, an application program 20' for an embedded application is developed with a full-featured operating system 18" that is constructed in modular form. In particular the computer code comprising each module 44 of the operating system 18" is structured to be contained in a well-defined location held in an operating system index 38. For example an operation designated by the name 40 "F1" might be contained at a module 44 at a defined set of instructions following a header F1. Of course it is not necessary that the operation 44 be contiguous provided its location can be defined.

The operating system shown in FIG. 4 is in source code, for being compiled selectively as will be described. For the purpose of developing the application program 20', however, on a desktop computer 10, the operating system may be compiled in it's entirety and loaded into the computer 10 and used as a conventional full-featured operating system Within each operation of the uncompiled operating system 18" are conditional compilation instructions of the form "IF DEFINE X" which provide instructions to the compiler as to whether the instructions following the IF DEFINE statement are to be compiled or discarded in the compilation. Such conditional compilations instructions are well known in the art and are conditional on define flags (the X in the IF DEFINE X form above) which are provided to the compiler. The modular nature of the operating system (e.g., divisions between F1 and F2) and the use of conditional compilations instructions by the define flags allows the operating system to be divided very finely. For example, if the operation call F1 provides disk access routines and no disks are used in the embedded application, the entire F1 operation may be eliminated. If on the other hand, disk reads are necessary, but no disk writing is necessary, portions of the operation F1 may be selected by conditional compilation of the module of F1. Thus, the modularity of the operating system, which allows the operating system to be divided into different modules according to which will be used by the application program can be considered to be either the division of the operating system by operation (e.g., F1, F2, etc.) or the division of the operating system by conditional compiler instructions.

In a first step in the present invention, the application program 20' for an embedded application, (normally a source code object) is reviewed by a scanner program 50 which reads the text of the application program 20' to collect a list of operation names 40 used in the application program 20' by comparison of those names to the API 28. The API, discussed above, lists the names 40 (e.g., F1) of all legal operating system operations. Use of the API 28 allows the scanner program 50 to distinguish compiler functions and user defined functions from operating system operations and allows the same scanner program 50 to be used with later versions of the operating system 18" which may have an enlarged API reflecting additional operations and operation names 40.

The scanner 50 collects each operating system operation name 40 in a OS module list 53. In the present example, OS module list 53 includes operating system operations F1 and F2 which are directly referenced in the application source code 20'. Thus, in operation, the scanner program 50 reads the text of the application source code 20' and compares it to the template provided by the operating system API 28 to create a OS module list 53 of operating system calls used directly by the application source code 20'.

The scanner 50 also receives environmental information 49 contained in the application program 20' such as may indicate the expected environment of the application program (e.g., how much memory is required, whether particular input and output devices are used, etc.) Such information may be express in compiler statements indicating memory to reserve or included libraries in the compilations. For example, and included text font file would indicate a display screen is to be used and possibly what kind of display.

In addition, the scanner may also receive a run-time information file 55, indicating what resources the application program 20' uses based on a monitoring of the application program 20' when it is executed in the computer system 10 operating with the full featured compiled version of the operating system 18".

The run-time information file 55 may also be collected from the set-up parameters of the simulation environment used to troubleshoot the application program 20' on the desk top computer 10. Thus the programmer may simulate the embedded application on the computer 10 in order to test the application program 20' and the parameters of this simulation (what sort of drives and inputs, the simulated embedded system used) can be the basis for the run-time information.

From the run-time information file 55 and the environmental information 49, the scanner also prepares a define list 41 indicating the defines within each OS module 44 that must be enabled so that the proper portions of the module 44 are compiled. For this purpose the scanner 50 may employ a look-up table that relates certain hardware items deduced from the environment statement or run-time information to one or more define flags in the operating system 18". In the present example, the environmental information 49 and the run-time information file 55 may indicate that the define flag X is required to be enabled for the particular application program 20'.

The OS module list 53 is used by a builder program 52 which also reviews an OS cross reference table 46 and determines what other modules 44 are called by the operations detected in the application source code 20'. In turn, each of these module 44 is examined (via the cross reference table 46) for calls it makes to other operating system modules 44 until no new called modules 44 are found and a complete set of operations necessary to run the application source code 20' has been determined. Thus, in this example, the operation F2 called by the application program 20' calls the operation F3, the latter which is thus necessary for execution of the application program 20' even though it is not directly called by the application program.

The builder 52 selects from the operating system 18" all the operations directly or indirectly referenced by the application program 20' as identified by the scanner (in the OS module list 53) and by the OS cross reference table and produces a reduced OS 54 containing a subset of the source code of the operating system 18" but typically still a substantial amount of code.

This reduced OS 54 is then provided to a compiler linker 56 together with the application program 20'. Compiler linker 56 operates in the manner of a conventional compiler in that it translates the source code mnemonics of the reduced OS 54 and the application program 20' to a machine code suitable for a particular CPU 12 and links the compiled code together to form a memory image file 62 suitable for loading into memory of an embedded controller. During the compilation process, instructions in the application source code 20' and reduced OS 54 are converted to hexadecimal numbers that may be interpreted by the CPU 12 to cause the execution of those instructions. Often a single instruction in the application source code 20' will compile to multiple instructions in an application object code 58.

The compiler, does not, however compile all of the instructions of the reduced OS but follows the conditional compilation instructions embedded in the OS operations (IF DEFINES) previously described. In particular the define list 41 prepared by the scanner is provided to the compiler to control which portions of the reduced OS 54 are actually compiled. The remaining portions are discarded and are not represented in the memory image file 62 of an operating system kernel 60. In addition to the define variables of the define list 41 it is necessary to determine sections of the operating system modules 44 that will be compiled according to the define list 41 that internally define other define flags. This is done by a define cross reference 57. For example, in the present example of FIG. 4, the part of operation F1 that is compiled when the define flag X is defined, itself defines Y, and thus Y must be defined to be compiled even though it is not directly referenced by the define list. As with the OS cross reference table 46, the define cross reference table 57 must be consulted for these additional indirect defines as well and any new defines must also be applied to the cross reference table and so forth until now new define flags are identified.

These define flags when provided to the compiler identify which portions of the modules of the reduced OS 54 will be compiled and thus serve to further reduce the size of the OS 18"

As is well understood in the art, at the time of compilation, references to variables in the application source code 20' and reduced OS 54 invoked by tags or labels denoting those variables, are not resolved nor are the actual jump addresses needed for the operating system calls 30 resolved. These memory references are resolved during the linking to a particular memory space. In the present invention, the linker has information, input to it by the programmer, as to the size of the memory 16 available to the embedded application program 20' and thus may assign physical memory addresses to each variable and each absolute jump or branch instruction.

At this time the linker part of the compiler linker 56 resolves the jumps represented by the calls 30 to modules 44 so that the application program 20' and the reduced OS 54 program connect together properly. This process of resolving references to memory by means of a linker or loader, is well understood in the art and differs in this application only by the fact that the linker redirects calls to the operating system 18' instead to the reduced OS 54. This redirection can be accomplished by having the builder 52 create a cross reference table between addresses of the modules 44 of the operating system 18' (held in the operating system index 38)

and the operation calls of the reduced OS 54, but in the preferred embodiment, each of the modules 44 of the reduced OS 54 is a separate source file and may be compiled with the application program by standard compiler techniques to produce the linked application object code 58 and compiled operating system kernel 60. Compiler linker 56 may be a generally available compiler suitable for use with higher level computer languages.

Development of the application program 20' may be done on a standard desk-top computer system 10 using the entire modular operating system 18" installed or an equivalent non-modular operating system having the same or similar API.

In conclusion, a single object code memory image file 62 may be created holding the compiled application program 58 and the operating system kernel file 60 and which may be directly loaded into the embedded application by a "burning" of a read-only memory or the like.

It will be understood to those of ordinary skill in the art that the step of compiling can be varied in this process and that the application source code 20' may be pre-compiled as well as the portions of the modular operating system so that only the linking step need be performed after the reduced operating system 54 is developed by the builder 52.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. A program for producing a memory image file for an embedded computer that may execute an application program developed on a development computer system to run on a standard full featured operating system, where the application program makes standard operating system calls, the embedded computer having less memory and fewer hardware components than the development computer system and being unable to support the standard full featured operating system, the program comprising:

a) a modular operating system mirroring the functions of the full-featured operating system in a plurality of source code operating system modules invokable by the operating system calls from the application program, the source code operating system modules including those providing functions required to interface an application program to the hardware components;

b) a scanner program receiving the application program and scanning it for the operating system calls to the full-featured operating system to produce list of the source code operating system modules required by the application program when run on the embedded computer; and c) a compiler compiling the application program and the source code operating system modules on the list, together, to produce a memory image file that fits within the limited memory of the embedded computer that provides a sufficient operating system less than the full featured operating system for the application program invokable by standard operating system calls.

2. The program of claim 1 wherein the full-featured operating system is compiled and requires as compiled a first amount of memory and wherein the source code operating system modules on the list compile to a second amount of memory smaller than the first amount of memory.

3. The program of claim 1 wherein the source code operating system modules provide functions to interface the application program to different hardware components using a single standard operating system call.

4. The program of claim 1 wherein the source code operating system modules are divided into portions preceded by conditional compiler directives so that they are compiled only if the directive is true and wherein the scanner sets the directives so that only portions of each source code operating system module may be compiled into the memory image file.

* * * * *